A. Le ROY & W. M. HUNTING.
Ticket-Clasp.

No. 162,565.

Patented April 27, 1875.

Witnesses:
Will W. Dodge
Donn Twitchell

Inventors:
A. LeRoy &
W. M. Hunting,
by Dodge & Son,
Attys.

UNITED STATES PATENT OFFICE.

ALPHONZO LE ROY AND WILLIAM M. HUNTING, OF LITTLE FALLS, N. Y.

IMPROVEMENT IN TICKET-CLASPS.

Specification forming part of Letters Patent No. 162,565, dated April 27, 1875; application filed April 5, 1875.

*To all whom it may concern:*

Be it known that we, ALPHONZO LE ROY and WILLIAM M. HUNTING, of Little Falls, in the county of Herkimer and State of New York, have invented certain Improvements in Ticket Clasps, of which the following is a specification:

Our invention relates to that class of ticket clasps or holders intended for the use of travelers; and the invention consists of two small metallic frames united by a spring-bar, and a guide-pin and tube, for clasping and holding the ticket, with a pin for fastening it to the person, as hereinafter more fully described.

Figure 1:
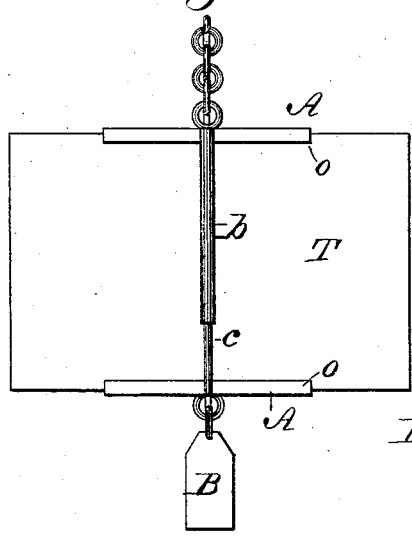
Figure 2:
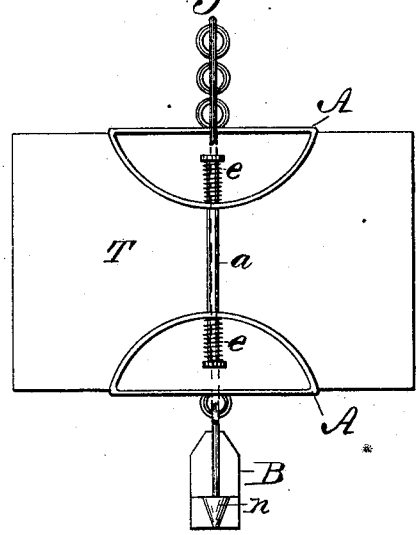
Figure 3:
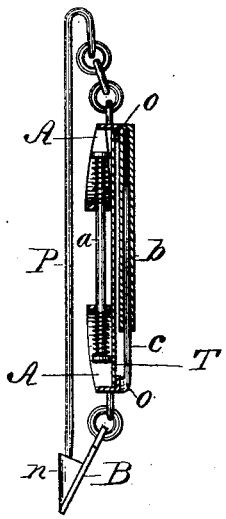

Figure 1 is a front view of the device with a ticket in it. Fig. 2 is a rear view of the same; Fig. 3, a transverse vertical section.

In constructing our ticket-holder, we provide two small skeleton frames A, of the style shown in Fig. 2, and connect them by a small wire, $a$, which passes through a hole in the curved bar of each, and on each end of this wire is secured a small spiral spring, $e$, as shown in Figs. 2 and 3, the springs tending to draw the two frames together.

The outer edges of the frames A are provided with an overhanging lip or flange, $o$, as shown in Fig. 1, the space under these lips being of such a size as to permit the edges of the ticket T to rest therein. To the upper lip $o$ there is secured a tube, $b$, and to the lower one in like manner is secured a pin, $c$, the pin sliding freely within the tube $b$, the two serving as a guide to keep the frames A in line, and prevent them from being turned independently of each other.

To the upper frame A a pin, P, is secured by two or three small links, and to the lower one is secured, by a flexible joint, a pendant, B, provided with a socket or cap, $n$, to receive and hold the point of the pin, as shown in Fig. 3—the flexible connections of the pin and its socket $n$ permitting the frames A to be shoved more or less apart, to receive tickets of different widths, without unfastening the point of the pin P.

To use the device, the ticket T is inserted between the frames A, as shown in Figs 1 and 2, under the lips $o$, the springs $e$ drawing the frames toward each other, thereby clamping the ticket securely between them. It is then fastened to the clothing of the traveler at any convenient place, by the pin P, or the ticket may be inserted after the holder is secured in place, as preferred. By the use of this simple device, the ticket is kept always in sight, thus saving time and annoyance both to the passenger and the conductor, and the danger of losing the ticket is greatly lessened.

Having thus described our invention, what we claim is—

A ticket-holder consisting of the two clamping frames A, united by the rod $a$, having the springs $e$ arranged thereon, with the pin P attached, all being constructed to operate substantially as described.

ALPHONZO LE ROY.
WILLIAM M. HUNTING.

Witnesses:
R. B. TRUE,
R. O. BARNES.